United States Patent [19]
Marianetti, II

[11] Patent Number: 5,574,862
[45] Date of Patent: Nov. 12, 1996

[54] MULTIPROCESSING SYSTEM WITH DISTRIBUTED INPUT/OUTPUT MANAGEMENT

[75] Inventor: Ronald Marianetti, II, Mountain View, Calif.

[73] Assignee: Radius Inc., San Jose, Calif.

[21] Appl. No.: 23,820

[22] Filed: Apr. 14, 1993

[51] Int. Cl.$^6$ .................................................. G06F 13/00
[52] U.S. Cl. .................... 395/200.08; 395/740; 395/288; 395/474; 364/228.1; 364/229; 364/940; 364/DIG. 1
[58] Field of Search ........................ 395/200.03, 200.01, 395/200.02–200.07, 200.09–200.21, 287, 288, 474, 740

[56] References Cited

U.S. PATENT DOCUMENTS

| | | | |
|---|---|---|---|
| 4,648,029 | 3/1987 | Cooper et al. | 364/200 |
| 4,669,079 | 5/1987 | Blum | 370/85 |
| 4,674,033 | 6/1987 | Miller | 364/200 |
| 4,730,268 | 3/1988 | Marin | 364/900 |
| 4,862,354 | 8/1989 | Fiacconi et al. | 364/200 |
| 4,949,239 | 8/1990 | Gillett, Jr. et al. | 364/200 |
| 5,001,662 | 3/1991 | Baum | 384/757 |
| 5,050,072 | 9/1991 | Earnshaw et al. | 364/200 |
| 5,068,781 | 11/1991 | Gillett, Jr. et al. | 395/325 |
| 5,095,526 | 3/1992 | Baum | 395/725 |
| 5,123,094 | 6/1992 | MacDougall | 395/375 |
| 5,247,616 | 9/1993 | Berggren | 395/200.08 |
| 5,274,631 | 12/1993 | Bhardwaj | 370/60 |
| 5,303,358 | 4/1994 | Baum | 395/375 |
| 5,325,492 | 6/1994 | Bonevento et al. | 395/309 |
| 5,357,612 | 10/1994 | Alaiwan | 395/200.08 |
| 5,361,362 | 11/1994 | Benkeser et al. | 395/290 |
| 5,384,890 | 1/1995 | Anderson et al. | 395/2 |
| 5,428,781 | 6/1995 | Duault et al. | 395/228.1 |
| 5,434,976 | 7/1995 | Tan et al. | 395/200.07 |
| 5,481,735 | 1/1996 | Mortensen et al. | 395/200.01 |

OTHER PUBLICATIONS

Declaration of Stephen R. Homlund.
Declaration of Ronald Marianetti, II.
Neil McManus, "Radius preps Rocket booster," *MacWeek*, vol. 5, No. 31, Sep. 17, 1991, p. 1.
*MacPrePress*, "Saturn Five," vol. 2, No. 45, Oct. 15, 1991.
Tom Quinlan, "Apple's latest products get third-party support," *Infoworld*, vol. 13, Issue 42, Oct. 21, 1991.
Radius press release, "Radius Announces Saturn V—Multiprocessing Software for Macintosh II's and Quadras," Oct. 21, 1991.
Radius press release, "Radius Announces New Rocket Pricing," Oct. 21, 1991.
*Info Canada*, "Radius aims for greater market presence in Canada," vol. 16, No. 12, Dec. 1991.

(List continued on next page.)

*Primary Examiner*—Christopher B. Shin
*Attorney, Agent, or Firm*—Stuart P. Meyer

[57] ABSTRACT

A multiprocessing system uses remote file managers associated with each remote processor to prepare data for storage in a disk storage array. The data are then transferred from the remote processor to a host processor over one bus, and routed from the host processor to the disk storage array over another bus, all without intervention by the file manager associated with the host processor. Remote sound managers interpret sound generator calls and route them to a host sound manager for transfer to a sound generating device. Processors transfer processing requests and data with one another through direct access to a portion of each processor's memory. Virtual storage disks are created for each processor by interpreting conventional files as disks in the remote file managers. Conventional network services are provided over a computer bus by interpreting conventional network commands and translating them into a form communicable over the bus.

4 Claims, 5 Drawing Sheets

Microfiche Appendix Included
(14 Microfiche, 644 Pages)

OTHER PUBLICATIONS

*Desktop Publisher*, "Radius announces multi-processing software for Mac IIs and Quadras," Nov. 1991.
*Computer Currents*, "Rocket Men," vol. 9, No. 16, Jan. 14, 1992.
*MacPrePress*, "New Products," date unknown.
*Seybold Report on Desktop Publishing*, "Multiproccessing for th Mac," vol. 6, No. 6, Feb. 3, 1992.
*MacPrePress*, "New Hyphen RIP," Feb. 11, 1992.
Radius press release, "Radius Licenses Apple Software Technology," Feb. 11, 1992.
*Computer ResellerNews*, "Radius, Apple ink licensing agreement," Feb. 17, 1992.
Andrew Gore, "Radius licenses Mac Technology," *MacWeek*, vol. 6, No. 7, Feb. 17, 1992.
Steven Burke, "Radius RocketShare to Add Parallel Processing to Mac," *PC Week*, vol. 9, No. 8, Feb. 24, 1992.
*Computer Reseller News*, "Radius acquires Apple technology," Feb. 24, 1992.
*MacPrePress*, "Hyphen," date unknown.
Andrew Pasternack, Lee Bruno and Sue Ferrara, "A Wide Selection at Seybold 92," publication and date unknown.
Radius press release, "Macintosh Performance Blasts Off with Radius Rocket 33," Mar. 5, 1992.
*Seybold Report on Desktop Publishing*, "Other notes," vol. 6, No. 7, Mar. 9, 1992.
Robert L. Scheier, "Radius Board to Boost Mac Speed, Rocket 33 Uses 33MHz 68040 Motorola Chip," *PC Week*, vol. 9, No. 10, Mar. 9, 1992.
Jacqueline Emigh, "MacUpdate," *Computer Currents*, vol. 9, No. 20, Mar. 10, 1992.
Daniel Todd, "Software Splits Rendering Task," publication and date unknown.
*PC Week*, "Radius Software Boosts Macintosh," vol. 9, No. 7, Feb. 17, 1992.
Don Crabb, The Mac Manager, "It's PCTV Live!: A new kind of user support system," *MacWeek*, vol. 6, No. 12, p. 41, Mar. 23, 1992.
Courtney Cosgrove, "Speedier Macs," *Business Publishing*, Hot Type, News and Views, p. 15, Apr. 1992.
*MacPrePress*, "Macs on the march," vol. 3, No. 19, Apr. 7, 1992.
Radius press release, "Radius Inc. Announces Record Revenues for Second Quarter 1992," Apr. 14, 1992.
Kurt Carlson and Abby Christopher, "Distributed rendering by NuBus," *MacWeek*, vol. 6, No. 16, Apr. 20, 1992.
Winn L. Rosch, et al., "Blasting off: CPU Accelerators," *MacUser*, Jun. 1992, pp. 166 though 184.
Matthew Rothenberg, "Hyphen to RIP UP Rocket boards," *MacWeek*, vol. 6, No. 16, Apr. 20, 1992.
Christopher O'Malley, "Ganging Up On Computer Problems: Networks for PCs," publication and date unknown.
Steve Hannaford, "Coprocessors power up Mac graphics," *MacWeek*, vol. 6, No. 18, May 4, 1992.
Neil McManus, "DreamNet system speeds 3-D rendering over nets," *MacWeek*, vol. 6, May 4, 1992.
Ian Stokell, Newsbytes, "Radius Ships RocketShare," *Computer Currents*, vol. 10, No. 13, Nov. 17, 1992.
Radius press release, "Radius and Ray Dream Sign Agreement to Deliver Breakthough Distributed Processing Capabilities," Aug. 4, 1992.
Radius press release, "RocketShare Blasts Off!" Aug. 4, 1992.
Radus press release, "Radius Ships RocketShare," Nov. 3, 1992.
Video Tape, "Television Show—PCTV Live," date unknown.

MULTIPROCESSING SYSTEM WITH DISTRIBUTED INPUT/OUTPUT MANAGEMENT

CROSS-REFERENCE TO RELATED APPLICATION

U.S. application Ser. No. 07/951,676, Craddock, et al., filed Sep. 25, 1992.

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

MICROFICHE APPENDIX

This document includes a microfiche appendix comprising 14 microfiche for a total of 644 frames.

BACKGROUND OF THE INVENTION

This invention relates generally to digital computing systems and specifically to mutiprocessing systems using distributed resources for management of input and output functions.

Multiprocessor systems have arisen as the need for computing power has outstripped the evolution of single-processor computers. Multiprocessors are characterized by a number of processing units communicating with one another to solve a common problem or to solve diverse problems simultaneously.

One common limitation of multiprocessing systems is the manner in which communication between processors, or communication between a processor and a peripheral device (e.g., a disk storage array) is made. In systems where a large number of processors have frequent need for such communications, it becomes impractical for such communications to take place over a single bus fully controlled by a central computer.

Thus, prior known attempts have used multiple buses or distributed bus control among the processors of a multiprocessing system to reduce such loading. One recent example of such a system is disclosed in U.S. Pat. No. 5,123,094 to MacDougal. In the system taught by MacDougal, shared memory for each processor of a multiprocessor system is organized into pages, and each such page is owned by one of the processors. Therefore, each processor in an n-processor system reserves n−1 pages in of memory for outgoing messages to other processors and reserves 1 page for incoming messages from other processors.

Another system, disclosed in U.S. Pat. No. 5,050,072 to Earnshaw et al., uses a semaphore memory in each processor to keep track of whether a bus is available for use by any of the processors.

None of the known solutions adequately addresses the problem of reducing loading on the processor to which peripheral devices such as a disk storage array or a sound generating device are connected. Nor does any known solution provide a workable scheme for virtualizing a portion of a disk array as hard disk dedicated for use by a particular processor of the multiprocessing system, without regard to whether the virtualized portion is made up of contiguous disk sectors. Furthermore, the prior art techniques are not understood to provide a simple, effective, and memory-efficient manner of transferring data and commands from one processor to another without unduly disrupting the operation of the processors involved or any other processors. Finally, no known multiprocessing system provides an acceptable solution for accommodating conventional network services over a high-speed computer bus.

SUMMARY OF THE INVENTION

In accordance with the present invention, an improved multiprocessing system uses file manager subsystems connected to each processor to prepare data for storage on a disk array connected to a host processor. Since the data is prepared for storage at each remote processor, the file manager of the host processor need not prepare the data, thus freeing up the host processor for other tasks. The only task of the host processor in such case is to place the prepared data on a disk queue.

In another aspect of the invention, a conventional sound generating device is connected to the host processor, and is accessible only through calls to a host sound manager. As each remote processor needs to send data to the sound generating device, a remote sound manager traps such calls and transmits them over a bus to the host sound manager, thus allowing a sound generating device to be virtualized for each remote processor.

In yet another aspect of the invention, a first remote processor communicates with a second remote processor by testing and then raising a memory busy semaphore signal in a portion of the second processor's memory, placing commands in a command queue portion of the second processor's memory, and sending an interrupt to the second processor alerting it to these changes. The second processor in due course processes this data and returns the results by testing and setting a semaphore in the first processor's memory, storing the results in a command complete queue, and sending an appropriate interrupt to the first processor.

In a further aspect of the present invention, as each remote processor requires disk space for storing data, it creates a file on a disk array that appears to the creating processor as a virtual hard disk, but that appears to other processors in the system as a conventional data file. Since conventional data files need not occupy contiguous disk sectors, each remote processor enjoys a virtual hard disk without any requirement that such virtual hard disk be formed of contiguous space on the disk array.

In one other aspect of the invention, a conventional computer bus provides conventional network services among processors in the multiprocessing system by trapping conventional network calls and translating them to messages for transmission across the computer bus.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE DRAWINGS

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

As an additional disclosure, a program listing pertaining to a preferred embodiment of the invention is included as an appendix to this document. It should be noted that terminology in the program listing may differ from that in the remainder of the specification, but any such differences will be easily understood by one skilled in the art.

Figure 1:
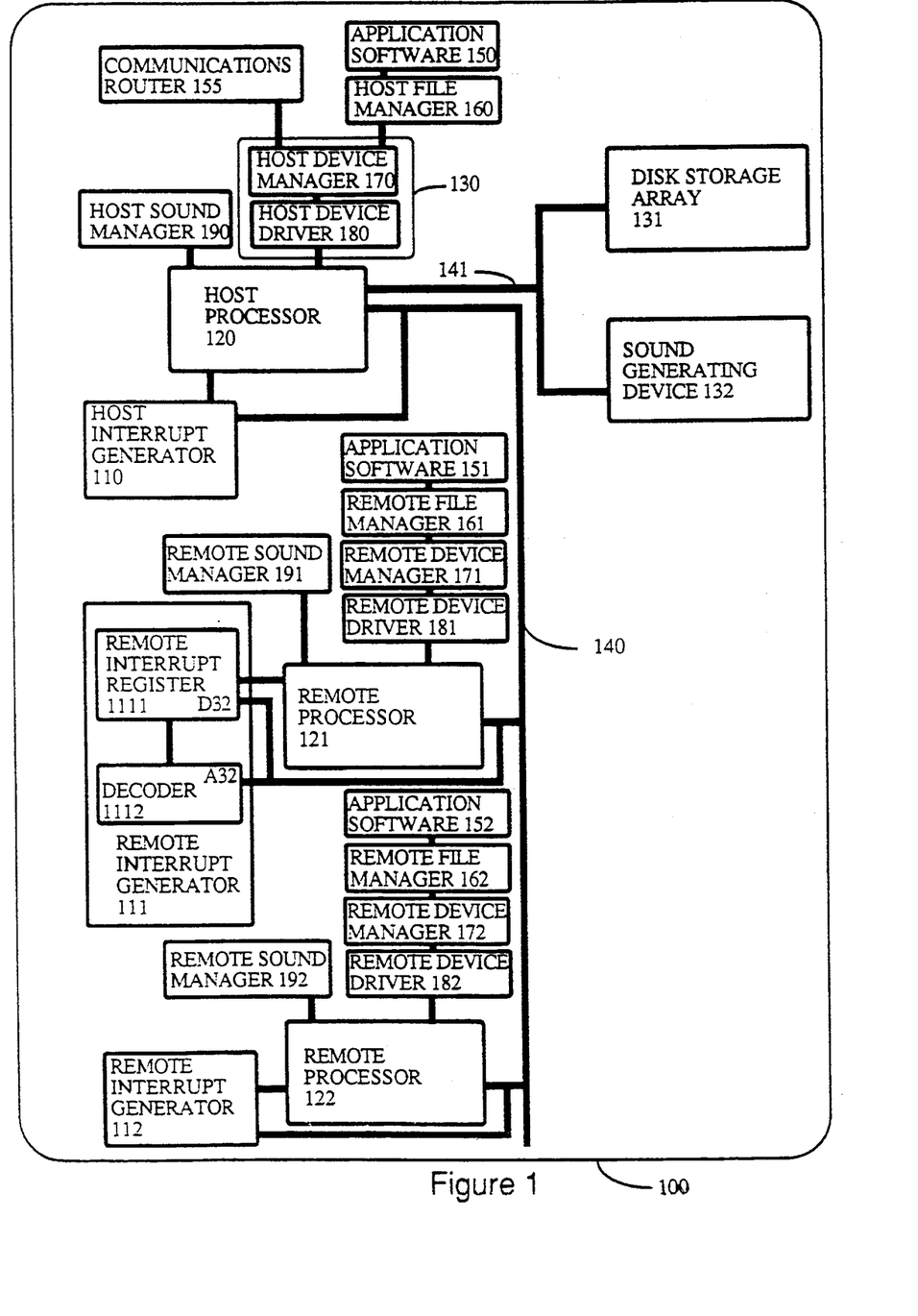
FIG. 1 is a block diagram of a multiprocessing system in accordance with the present invention.

Referring now to FIG. 1, there is shown a multiprocessing system 100 in accordance with the present invention. The major components of the system 100 include a host processor 120, disk storage array 131, sound generating device 132, local bus 141, and remote processors 121, 122, interconnected with the host processor 120 via high speed bus 140. The host and remote processors 120–122 each are provided with corresponding application software 150–152, file managers 160–162, device managers 170–172, device drivers 180–182, sound managers 190–192, and interrupt generators 110–112. In addition, host processor 120 is provided with a communications router 155. In a preferred embodiment, host processor 120, host interrupt generator 110, application software 150, host file manager 160, host sound manager 190, buses 140, 141 and sound generating device 132 are all conventional parts of a conventional microcomputer system, specifically a MACINTOSH computer provided by Apple Computer, Inc. Local bus 141 is the MACINTOSH local processor bus, high-speed bus 140 is the MACINTOSH "NUBUS" (operating according to ANSI/IEEE standard no. 1196-1987), application software 150 may be any conventional application software for a MACINTOSH computer, host file manager 160 is the conventional hierarchical file system, or "HFS" of the MACINTOSH computer, host device manager 170 and host device driver 180 are the conventional disk queue components of the MACINTOSH computer, and host sound manager 190 is the conventional sound manager of the MACINTOSH computer. In a preferred embodiment, host device manager 170 and host device driver 180 are collectively referred to as a disk queue 130, such as the disk queue conventionally used in the MACINTOSH computer, and disk storage array 131 may be any conventional hard disk storage device. Communications router 155 is implemented in a preferred embodiment through custom software modules named "SkyLabCom.a", "RocketCom.a" and "SkyLabAPI.a", and is further described below and in the appendix.

In a preferred embodiment, remote processors 121, 122 are conventional processor boards, such as the ROCKET 33 model accelerator board produced by Radius Inc. Application software 151, 152 may be any conventional application software for a MACINTOSH computer. Remote file managers 161, 162 and remote device managers 171, 172 are identical to host file manager 160 and host device manager 170, respectively, described above. Remote device drivers 181, 182, and remote sound managers 191, 192 are implemented in a preferred embodiment through custom software modules named "FileDisk.a" and "SkyLabSound.a", and are further described below and in the appendix. Remote interrupt generators 111 and 112 generate conventional interrupt signals to remote processors 121, 122 respectively, and are each implemented by a remote interrupt register, e.g., 1111 and a decoder, e.g., 1112. While FIG. 1 illustrates two remote processors in addition to a host processor, any number of remote processors may be used in accordance with the present invention.

Processor 120 is termed the host processor because it is the sole processor able to communicate directly with sound generating device 132 and with disk storage array 131. Host sound manager 120 operates in the conventional manner, translating sound calls from software running on host processor 120 (e.g., application software 150) into low-level sound commands and data for transmission to sound generating device 132 via host processor 120 and local bus 141.

Host file manager 160, host device manager 170 and host device driver 180 all operate in a conventional manner, translating calls to access files stored on disk from software running on host processor 120 (e.g., application software 150) into low-level disk driver commands and data transmitted to disk storage array 131 via host processor 120 and local bus 141.

The remote processors, e.g., 121, operate somewhat differently in communicating with sound generating device 132 and disk storage array 131. When software operating on remote processor 121 (e.g., application software 151) asserts a sound generation call, remote sound manager 191 interprets that call as if it were to a conventional sound manager (e.g., host sound manager 190) but does not send it to a sound generating device associated exclusively with remote processor 121. Instead, remote sound generator 191 generates an intermediate sound generation call that is transmitted to host sound manager 190 via remote processor 121, bus 140 and host processor 120. Second, remote sound manager 191 directs remote interrupt generator 111 to send an interrupt signal over bus 140 to briefly gain the attention of host processor 120. Finally, communications router 155 processes and sends to host sound manager 190 the intermediate sound generation call as if it were a conventional sound generation call produced by software (e.g., application software 150) operating on host processor 120.

Similarly, when software operating on remote processor 121 (e.g., application software 151) asserts a call to write data to a file, remote file manager 161 and remote device manager 171 interpret that call conventionally as if they were preparing for communication with a conventional device driver (e.g., host device driver 180) preparing data for storage in a dedicated disk storage device, but in reality there is no such dedicated device. Instead, remote device driver 181 then generates conventional low-level disk storage commands and transmits them, along with the data to be-transferred to disk, to host processor 120 via remote processor 121 and bus 140. Next, remote device driver 181 causes remote interrupt generator 111 to send an interrupt signal over bus 140 to briefly gain the attention of host processor 120. Finally, communications router 155 running on host processor 120 recognizes the disk access commands from remote device driver 181 and redirects the commands and data onto bus 141 for loading onto disk device manager 170 in the conventional manner. Thus, unlike the sound generation situation, a host manager (host file manager 160 in this case) is completely bypassed. This arrangement yields a significant speed benefit over the conventional manner of writing the data from remote processor 121 to host processor 120, and then using host file manager 110 to write the data to disk queue 130. Since host processor 120 is used in accordance with the present invention only as a pass-through for signal routing rather than for signal processing, very little processing load is added to host processor 120 using this technique. The host sound generator 190 could similarly be bypassed if the sound generating device 132 had associated with it a sound queue comparable to disk queue 130 or if overlapping of sound data was permissible.

As previously mentioned, interrupt generators, e.g., 111, are each made up of a remote interrupt register 1111 and a decoder 1112. In operation, decoder 1112 is connected to the 32 bit address portion of bus 140 and is configured to apply a chip select signal to remote interrupt register 1111 upon occurrence of a particular address on bus 140. When such an address is decoded, the chip select signal from decoder 1112 causes remote interrupt register 1111 to latch selected portions from the 32 bit data portion of bus 140 and apply that data to remote processor 121. Specifically, the lowest three bits D0–D2 from the data portion of bus 140 are latched and applied to the "IPL" interrupt inputs of remote processor 121. Thus, by sending an appropriate address and and appropriate data, the host processor 120 or another remote processor, e.g., 122, can cause an interrupt to be generated in remote processor 121.

When application software 151 running on remote processor 121 requires access to data already stored on disk storage array 131, the application software 151 generates a conventional file data request that is interpreted by remote file manager 161 as a request to a conventional device driver. This low-level request is transmitted to disk queue 130 through remote processor 121, bus 140, host processor 120, and communications router 155, again without any intervention by host file manager 160. Once the requested data are retrieved from disk storage array 131, communications router 155 recognizes this data as corresponding to that requested by remote processor 121, and therefore directs processor 120 to transfer the data from disk queue 130 directly to remote processor 121, for interpretation by remote device driver 181, remote device manager 171, and remote file manager 161, again without any involvement on the part of host file manager 160.

Figure 2:
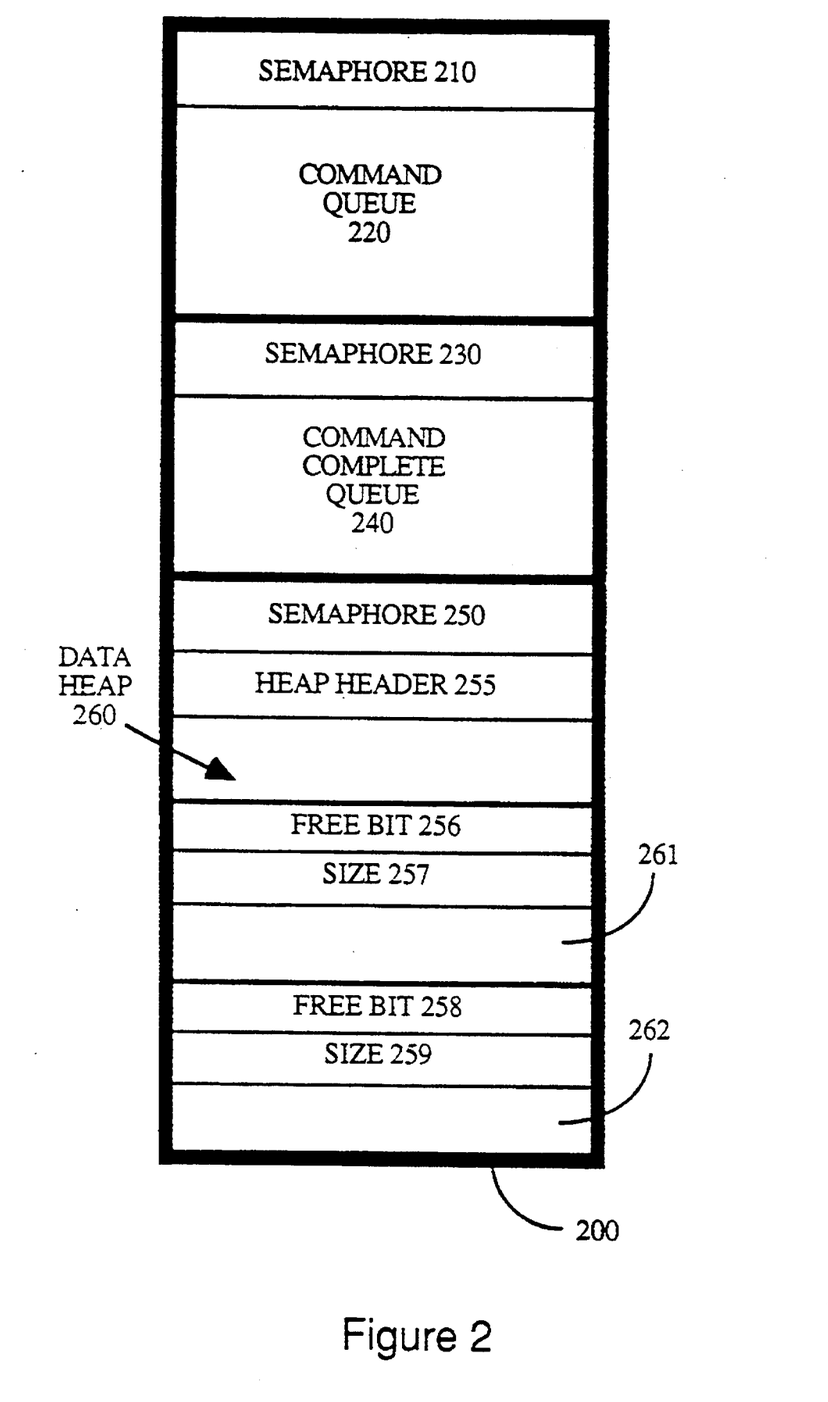
FIG. 2 is a portion of a memory map of random access memory for one of the processors illustrated in FIG. 1.

At times, one processor (e.g., 121) in the system 100 may request another processor (e.g., 120) to perform certain processing on data. In order to provide this capability, a shared memory technique is used. Referring now also to FIG. 2, there is shown a memory portion 200 of one of the processors (e.g., 120) of system 100. Memory portion 200 includes a command queue area 220 with associated semaphore area 210, a command complete queue area 240 with associated semaphore area 230, and a data heap 260 with associated semaphore area 250 and heap header 255. Data heap 260 also includes free bit areas, e.g., 256, 258 and size fields, e.g., 257, 259. In operation, when processor 121 desires to pass commands and data to processor 120 for processing, it tests semaphore 210 in a conventional manner to determine whether a memory busy signal is asserted or not. If this test reveals a memory busy state, that indicates that another processor is currently accessing command queue 220. In that case, processor 121 periodically retests semaphore 210 until the memory busy signal is no longer asserted, indicating that no other processor is currently accessing command queue 220. At that point, processor 121 asserts the memory busy signal of semaphore 210 to prevent any other processor from gaining access to command queue 220. Next, processor 121 places whatever commands are desired to be processed by processor 120 in command queue 220. Processor 121 similarly tests data heap semaphore 250, waits for it to be free, asserts a new data busy signal on data heap semaphore 250, and then places any data associated with the command queue commands into data heap 260. This step being completed, processor 121 releases the memory busy signals of semaphore 210 and semaphore 250, processor 121 sends a signal over bus 140 that, as previously described, causes host interrupt generator 110 to generate an interrupt signal to alert processor 120 that a processing request has been stored in command queue 220. In a preferred embodiment, processor 121 places data in data heap 260 before placing corresponding commands in command queue 220 in order to allow the commands to include an offset to the location of the associated data stored in data heap 260. In an alternative embodiment, interrupt generator 111 may be omitted, and host processor 120 may periodically poll its own command queue 220 to determine whether any processing requests have been stored in command queue 220 by another processor. During the entire process of testing for the state of semaphore 210, storing a processing request and associated data in command queue 220, and generating an interrupt signal by interrupt generator 111, processor 120 has been completely uninvolved and free to continue with whatever current processing task it has.

After a processor, e.g., 121, gains control of data heap semaphore 250, data for processing are stored in data heap 260 by first making reference to the contents of heap header 255. Heap header 255 contains an offset value to the first available block of memory, e.g., block 261, in heap 260. Data blocks, e.g., 261 are of variable size and are dynamically allocated within data heap 260 as needed. Each block, e.g., 261, includes a "free" bit, e.g., 256, used to indicate whether that block is available for use or is holding current data, and also includes a size field, e.g., 257, containing the size of the block, e.g., block 262 with associated free bit 258 and size 259. Data storage is accomplished by locating a free block, e.g., 261, that is large enough to store the required data, storing the data in that block 261 and updating the heap header 255, as well as any affected free bits, e.g., 256, 258 and offset bytes, e.g., 257, 259. In this configuration, data blocks, e.g., 256 are not "reserved" by any particular processor, but may be written to or read by any processor, e.g., 121, 122 in the system 100. Furthermore, data blocks, e.g., 256, are accessed only by offset addresses rather than absolute addresses, thus obviating the need for remote processors, e.g., 121 to keep track of the absolute addresses of available blocks.

Since each processor has associated with it a memory portion 200, after processor 120 completes the processing task requested by processor 121, processor 120 returns the processed data by a similar mechanism. Assume now that memory portion 200 is associated with processor 121. First, processor 120 tests the semaphore 230 of the command complete queue 240 of processor 121 and asserts a memory busy signal on semaphore 230 as soon as it is relinquished by another processor. Processor 120 then stores the command complete information in command complete queue 240, releases the memory busy signal on semaphore 230 and directs interrupt generator 111 to inform processor 121 of command completion. Again, an alternative embodiment could employ periodic polling rather than an interrupt generator. In a preferred embodiment, the functions of the direct memory access by a "guest" processor and the semaphore lock-out are implemented by software, further description of which is found in the "SkyLabMemMgr.a" module of the program listing in the appendix.

Figure 3A:
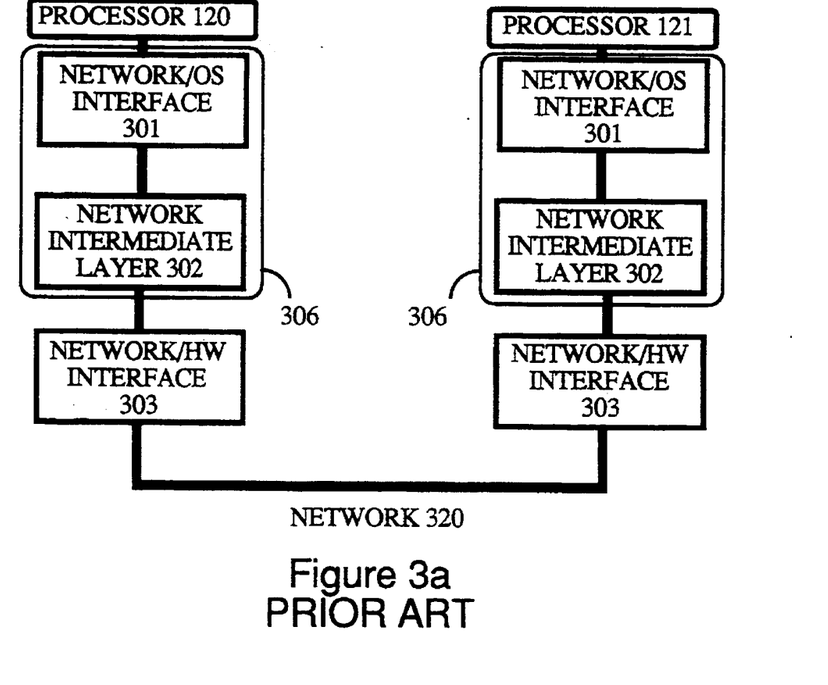
FIG. 3a is a conventional network configuration for providing network services between two processors.

Referring now to FIG. 3a, there is shown a conventional network configuration providing network services between processor 120 and processor 121. In the conventional manner, such services are provided through a network/operating system interface 301, coupled with an intermediate layer of network processing 302, coupled with an interface 303 to network hardware 320. Typically, network/operating system interface 301 and intermediate layer of network processing 302 are referred to collectively as a network manager 306. In the environment of the preferred embodiment, the network manager 306 consists of portions of the "AppleTalk" interface provided by Apple Computer, Inc., the network/hardware interface 303 is the "Link Access Protocol" interface provided by Apple Computer, Inc. for the "LocalTalk", "Ethernet" and "TokenTalk" environments, and the network 320 comprises the conventional hardware chips and wiring conforming to one of the conventional network standards, such as "LocalTalk", "Ethernet" or "TokenTalk".

Figure 3B:
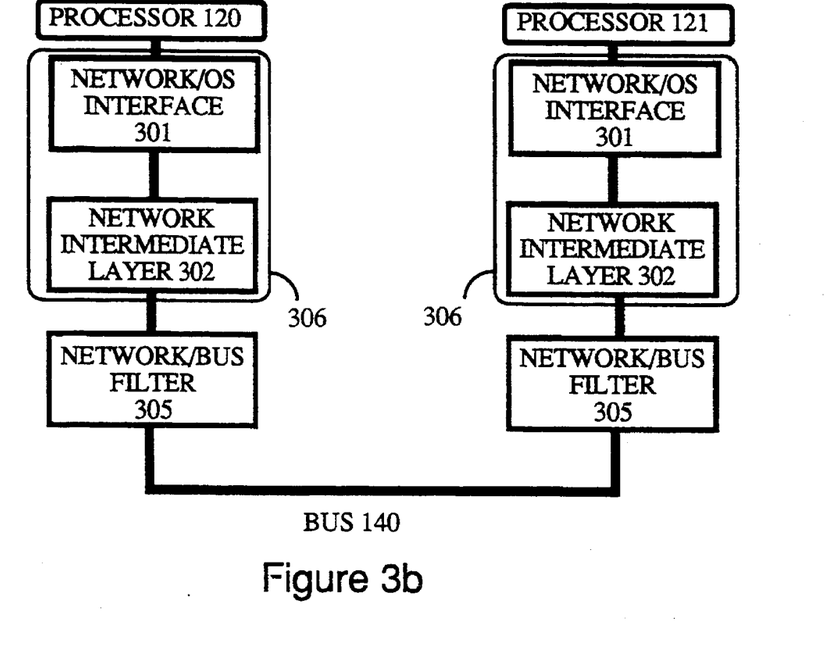
FIG. 3b is a bus configuration for providing network services between two processors in accordance with the present invention.

Referring now to FIG. 3b, the same conventional network services are made available to processors interconnected by bus 140 by replacing the network/hardware interface 303 with a network/bus filter 305 that receives network communications from network intermediate layer 302 and translates them into a form suitable for transmission over bus 140. In the preferred embodiment, network/bus filter 305 is implemented by software modules controlling signal flow in conventional bus 140. Network bus filter 305 uses memory area 200 divided into semaphore (or "status") portion, e.g., 210 and a command queue 220, as described in connection with memory portion 200 of FIG. 2.

Figures 4A, 4B:
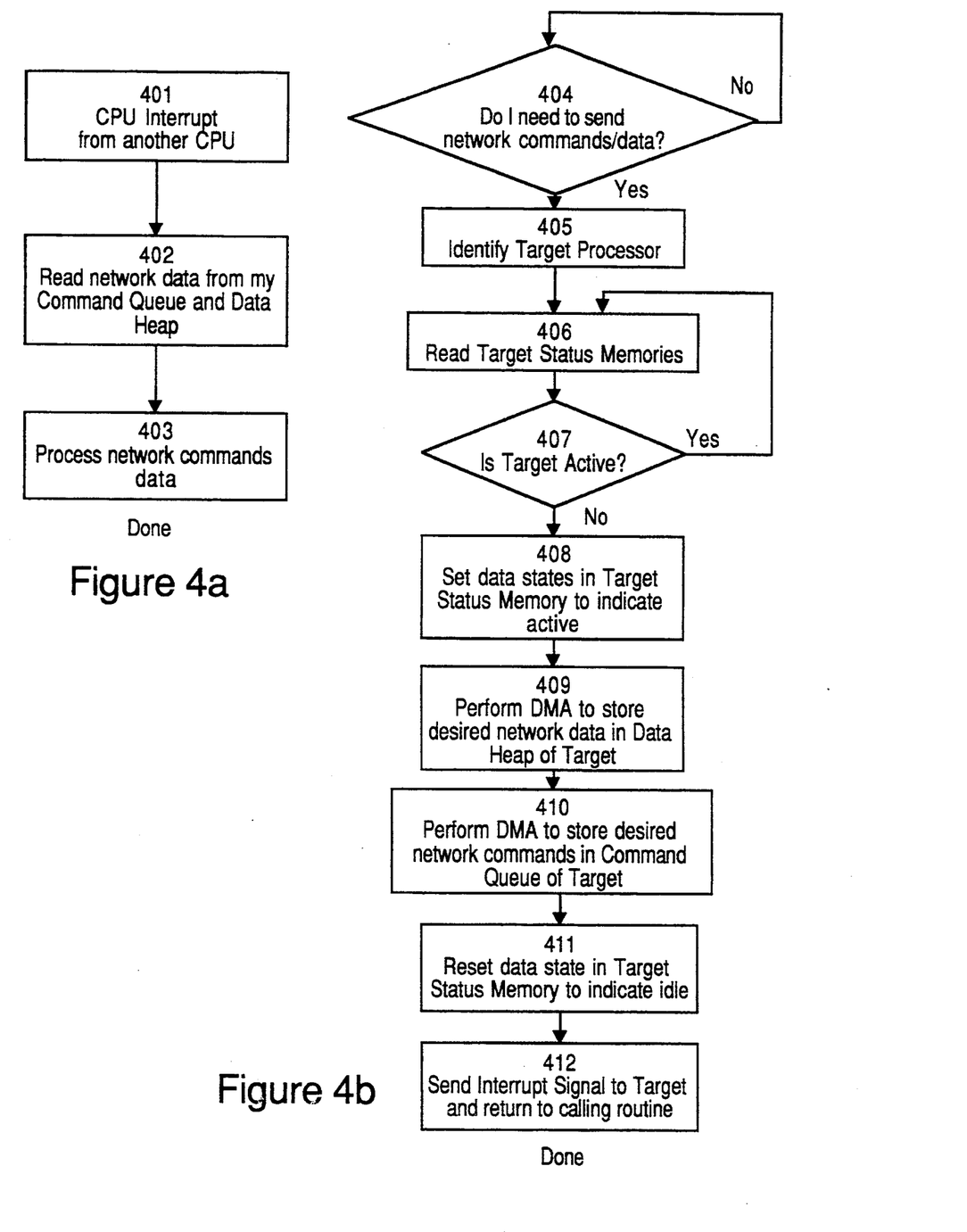
FIG. 4 is a flow diagram of the operation of the Network/Bus Filter illustrated in FIG. 3.

Referring also now to FIG. 4, the operation of the network/bus filter 305 is shown both for transmission and reception of network commands and data. For reception of network commands and data, processing begins with the receipt 401 of an interrupt at the target CPU by the transmitting CPU, indicating that the transmitting CPU has completed the transfer of network commands and data to the command queue 220 and data heap 260, respectively, of the target CPU. As a result of the interrupt, processing then moves to step 402, where the network commands and data are read 402 from the command queue 220 and data heap 260 of the target CPU. The final step 403 is to process those commands and data. In many cases, the processing of step 403 may itself involve the transmission of commands and data back to the initiating processor or even to another processor.

On the transmission side, processing begins at step 404 where a transmitting processor checks to see whether it needs to send any network commands or data. If so, the target processor is identified in step 405, the command queue semaphore 210 of the target processor's memory portion 200, as well as the data heap semaphore 250 if data associated with the commands are to be transmitted, are read by a direct memory access in step 406. If a check in step 407 of the semaphores 210, 250 of the target processor reveals that the target processor's command queue 220 or data heap 260 are currently active, processing returns to step 406. As the target processor's command queue 220 and data heap 260 become idle, the transmitting processor sets the command queue semaphore 210 and data heap semaphore 250 to again indicate that it is active in step 408; performs direct memory accesses 409, 410 as previously described to store network commands 311 in the command queue 220 and network data in the data heap 260 of the target processor's memory portion 200; resets 411 the semaphores 210, 250 of the target processor's memory portion 200 to indicate that it is again idle and ready for subsequent accesses; sends an interrupt signal 412 to the target processor indicating that a direct memory access operation has been performed on the target processor's command queue 220 and data heap 260; and returns processing to the routine of Network/OS Interface 301 that initiated the network transfer.

Alternatively, the interrupt signal may be omitted and conventional polling techniques may be used instead, and the reset step 411 may be performed by the target processor's filter 305 itself upon discovering that an access has been completed. Processing then returns to step 401. Further description regarding the structure and operation of network/bus filter 305 is found in the "NuBusNet.atlk.a" and "SkyLabCom.a" modules of the program listing in the appendix.

Figure 5:
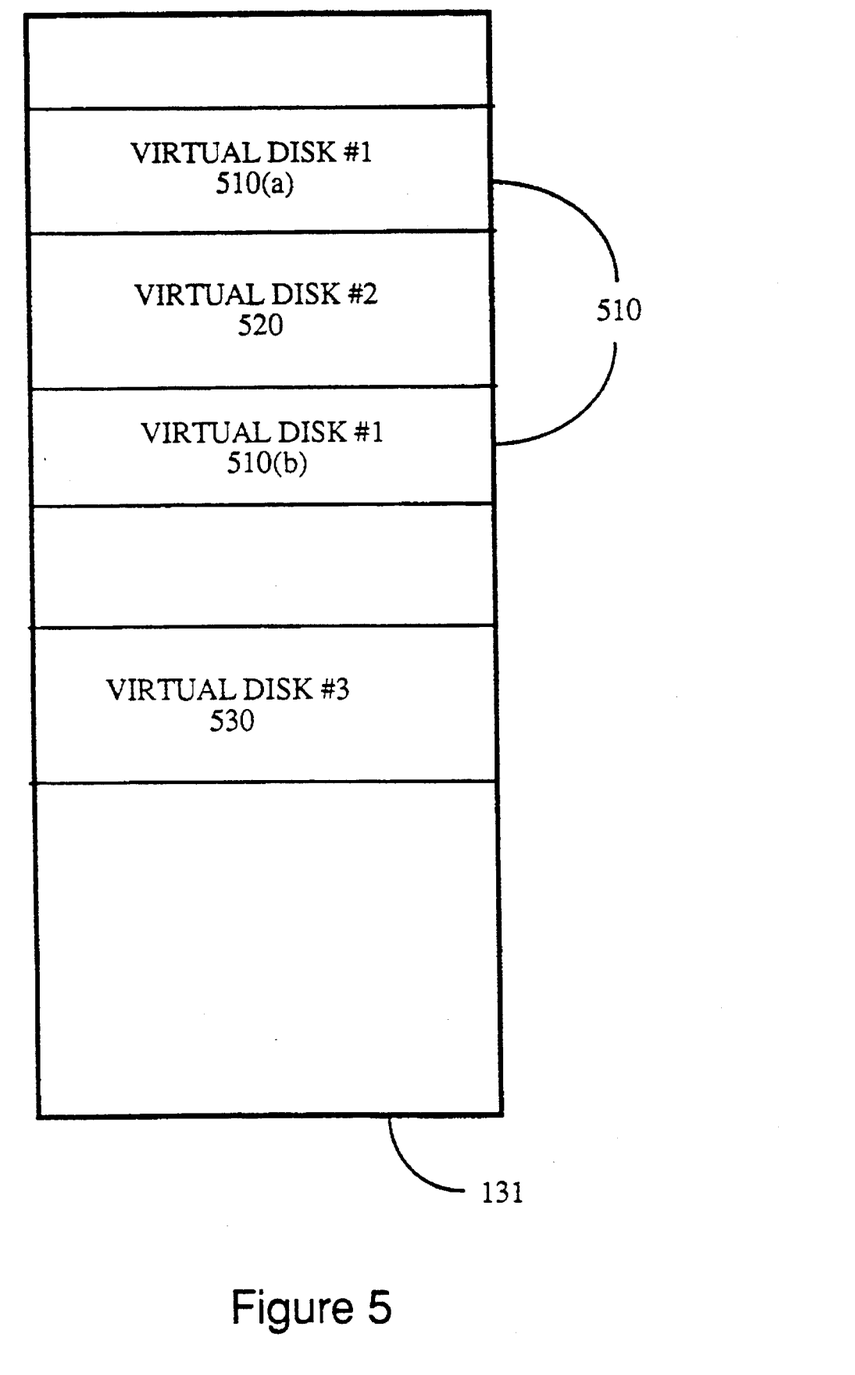
FIG. 5 is a memory map of disk array storage showing virtual disks in accordance with the present invention.

Referring now to FIG. 5, there is shown a memory map of disk storage array 131 showing non-contiguous virtual disks 510, 520, 530. In accordance with the present invention, virtual disks (e.g., 510) are created by a host file manager, host device manager and host device driver (e.g., 160, 170, 180) creating a conventional logical disk file on disk storage array 131. The remote file manager, remote device manager and remote device driver 161, 171, 181 translate disk calls from processor 121 into conventional file calls for storage in virtual disk 510 of disk storage array 131. Since the MACINTOSH operating environment does not require files to occupy contiguous sectors of a disk, virtual disk 510 may actually occupy two or more non-contiguous areas 410(a) and 410(b) on disk storage array 131. As each processor requires greater or less disk storage for its corresponding virtual disk, the areas occupied by each virtual disk may dynamically occupy new areas formerly used by other virtual disks, thereby increasing the efficiency of storage array 131 compared with systems requiring use of contiguous sectors for each virtual disk. Because the virtual disks appear as conventional files to other processors in the system 100, there is no risk that another processor will over-write a virtual disk by attempting to use the same disk space. This functionality is implemented in-the preferred embodiment by software modules, and is further described in the "FileDisk.a" module of the program listing in the appendix.

From the above description, it will be apparent that the invention disclosed herein provides a novel and advantageous multiprocessing system that distributes memory management to reduce loading on a host processor. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. Memory-sharing apparatus in a multiprocessing system including a first processor, a second processor, and a bus coupling said first processor and said second processor, the memory-sharing apparatus comprising:

a first memory coupled to said first processor and communicating with said bus, said first memory being configured to include a first memory status portion, and a first memory command queue;

a data heap memory coupled to said first processor and communicating with said bus, said data heap memory being configured to include a data heap status portion and a plurality of variably-sized data blocks;

second status means in said second processor, communicating with said first memory status portion over said bus, configured to assert an active data state in said first memory status portion in response to reading from said first memory status portion a non-active data state and in response to a state of said second processor calling for transfer of commands to be processed to said first memory; said second status means also being configured to assert an active data state in said data heap status portion in response to reading from said data heap status portion a non-active data state and in response to a state of said second processor calling for transfer of data to be processed to said data heap memory;

command assertion means in said second processor, communicating with said first memory over said bus, configured to store commands to be processed in said first command queue portion responsive to assertion of said active data state in said first memory status portion by said status means;

data assertion means in said second processor, communicating with said data heap memory over said bus, configured to store data to be processed in a subset of said plurality of variably-sized data blocks responsive to assertion of said active data state in said data heap status portion by said status means;

first interrupt means communicating with said first processor, configured to send first processor a first interrupt signal indicative of storage of data to be processed in said first command queue;

a second memory coupled to said second processor and communicating with said bus, said second memory being configured to include a second memory status portion, and a second memory command complete queue;

first status means in said first processor, communicating with said second memory status portion over said bus, configured to assert an active data state in said second memory status portion in response to reading from said second memory status portion a non-active data state and in response to a state of said first processor calling for transfer of processed data to said second memory;

command complete assertion means in said first processor, communicating with said first command complete queue portion over said bus, configured to store processed data in said second command complete queue portion responsive to assertion of said active data state by said first status means; and second interrupt means, communicating with said second processor, configured to send said second processor a second interrupt signal indicative of storage of processed data in said first command complete queue.

2. A method of sharing memory in a multiprocessing system including a first processor with a first memory, a second processor with a second memory, and a bus coupling said first processor and said second processor, the memory-sharing method comprising the steps of:

allocating a first memory status portion, a first memory command queue, a first memory data heap status portion, and a first memory data heap within said first memory;

allocating a second memory status portion and a second memory command completion queue within said second memory;

asserting, by said second processor, an active data state in said first memory status portion in response to said second processor reading a non-active data state in said first memory status portion and in response to a state of said second processor calling for transfer of commands to be processed to said first memory;

asserting, by said second processor, an active data state in said first memory data heap status portion in response to said second processor reading a non-active data state in said first memory data heap status portion and in response to a state of said second processor calling for transfer of data to be processed to said first memory;

storing, by said second processor, commands to be processed in said first command queue, in response to assertion of said active data state in said first memory command queue status portion by said second processor;

storing, by said second processor, data to be processed in said first memory data heap, in response to assertion of said active data state in said first memory data heap status portion by said second processor;

asserting, by said second processor, an interrupt signal indicative of storage of data to be processed in said first command queue;

asserting, by said first processor, an active data state in said second memory status portion in response to said first processor reading a non-active data state in said second memory status portion and in response to a state of said first processor calling for transfer of processed commands and data to said second memory;

storing, by said first processor, processed commands and data in said second command complete queue, in response to assertion of said active data state by said first processor; and asserting, by said first processor, an interrupt signal indicative of storage of processed data in said first command queue.

3. A multiprocessing system as in claim 2, wherein said first memory including a first status portion and a first command queue; wherein said second memory is configured to assert an active data state in said first memory status portion in response to reading from said first memory status portion a non-active data state and in response to a state of said second processor calling for network services with said first processor, said second memory further storing data corresponding to said desired network services in said first command queue in response to assertion of said active data state by said second memory, said first memory further periodically polling said first memory to detect changes therein indicative of storage of data therein by said second memory.

4. A method of providing conventional network services between a first processor having a first network manager and a second processor having a second network manager, said first and second processors communicating over a high-speed computer bus, the method comprising the steps of:

interposing a first filter between said first network manager and said bus, said first filter having first memory means including a first status portion and a first command queue;

interposing a second filter between said second network manager and said bus, said second filter having second memory means including a second status portion and a second command queue;

communicating network commands from said first processor to said second processor by:

i. asserting, by said first processor, an active data state in said second status portion in response to said first processor reading a non-active data state in said second status portion;
ii. storing, by said first processor, said network commands in said second command queue, in response to assertion of said active data state by said first processor; and
iii. asserting, by said first processor, an interrupt signal indicative of storage of said network commands in said first command queue; and communicating network commands from said second processor to said first processor by:

i. asserting, by said second processor, an active data state in said first status portion in response to said second processor reading a non-active data state in said first status portion;
ii. storing, by said second processor, said network commands in said first command queue, in response to assertion of said active data state by said second processor; and
iii. asserting, by said second processor, an interrupt signal indicative of storage of said network commands in said first command queue.

* * * * *